United States Patent [19]

Nodelman et al.

[11] Patent Number: 6,057,416
[45] Date of Patent: May 2, 2000

[54] CATALYST PACKAGE FOR USE IN RIM SYSTEMS CONTAINING ACIDIC ADDITIVES

[75] Inventors: Neil H. Nodelman, St. Clair; Albert Magnotta, Monaca; Robert Loring, Library, all of Pa.

[73] Assignee: Bayer Corporation, Pittsburgh, Pa.

[21] Appl. No.: 08/335,432

[22] Filed: Nov. 7, 1994

Related U.S. Application Data

[63] Continuation of application No. 08/207,504, Mar. 8, 1994, and a continuation-in-part of application No. 08/052,009, Apr. 22, 1993, abandoned.

[51] Int. Cl.[7] ................................................. C08G 18/18
[52] U.S. Cl. .......................... 528/53; 528/55; 521/125; 521/129
[58] Field of Search ...................... 521/125, 129; 528/53, 55; 252/182.24

[56] References Cited

U.S. PATENT DOCUMENTS

| | | | |
|---|---|---|---|
| 3,168,497 | 2/1965 | Twitchett | 260/77.5 |
| 3,726,952 | 4/1973 | Boden et al. | 264/48 |
| 3,925,527 | 12/1975 | Kleimann et al. | 264/53 |
| 4,058,492 | 11/1977 | von Bonin et al. | 260/2.5 AM |
| 4,098,731 | 7/1978 | von Bonin et al. | 521/51 |
| 4,110,135 | 8/1978 | Graham et al. | 149/19.4 |
| 4,111,861 | 9/1978 | Godlewski | 521/123 |
| 4,184,031 | 1/1980 | Graham et al. | 528/55 |
| 4,201,847 | 5/1980 | Kleimann et al. | 521/172 |
| 4,239,857 | 12/1980 | Harper | 521/121 |
| 4,254,228 | 3/1981 | Kleimann et al. | 521/128 |
| 4,379,105 | 4/1983 | Taylor et al. | 264/45.5 |
| 4,519,965 | 5/1985 | Taylor et al. | 264/51 |
| 4,581,386 | 4/1986 | Taylor et al. | 521/125 |
| 4,764,540 | 8/1988 | Dewhurst et al. | 521/110 |
| 4,792,576 | 12/1988 | Nodelman | 521/174 |
| 4,868,224 | 9/1989 | Harasin et al. | 521/124 |
| 4,895,879 | 1/1990 | Nelson et al. | 521/105 |
| 4,954,537 | 9/1990 | Sanns, Jr. | 521/157 |
| 5,137,966 | 8/1992 | Nodelman | 524/772 |
| 5,158,607 | 10/1992 | Mafoti et al. | 106/243 |

OTHER PUBLICATIONS

F.M. Sweeney; Intro. to Reaction Injection Molding; 1979; pp. 68–69, pp. 54–55.

*Primary Examiner*—Rachel Gorr
*Attorney, Agent, or Firm*—Joseph C. Gil; N. Denise Brown

[57] ABSTRACT

Increases in reactivity of acidic containing RIM systems are reduced by inclusion of a catalyst system of a zinc-containing compound, a non-zinc containing metal compound and a tertiary amine.

3 Claims, No Drawings

CATALYST PACKAGE FOR USE IN RIM SYSTEMS CONTAINING ACIDIC ADDITIVES

CROSS-REFERENCE TO RELATED APPLICATIONS

This application is a continuation, of application Ser. No. 08/207,504 filed Mar. 8, 1994 which is a continuation-in-part of application Ser. No. 08/052,009 filed on Apr. 22, 1993, both abandoned.

BACKGROUND OF THE INVENTION

Internal mold release agents used in the production of molded polyurethane and polyurea products are known. Many of the known internal release agents are based at least in part on fatty acid esters. Typical of such release agents are those described in U.S. Pat. Nos. 3,726,952, 3,925,527, 4,058,492, 4,098,731, 4,201,847, 4,254,228, 4,868,224 and 4,954,537, and British Patent 1,365,215.

U.S. Pat. Nos. 4,519,965 and 4,581,386 describe the use of zinc carboxylates as internal mold release agents for the production of molded polyurethane and/or polyurea elastomers.

More recently developed internal mold release agents are also acidic in nature. Typical of such release agents are those based on polymerized fatty acids, lower alkyl acetoacetates, and esters of saturated/unsaturated monocarboxylic acid mixtures (U.S. application Ser. Nos. 07/698,069, 07/660,759, and 07/697,153, filed on Apr. 22, 1991, Feb. 25, 1991, and May 8, 1991, respectively).

One recurring problem with all of these acidic internal release agents is that they generally cause an increase in the reactivity of the system, while at the same time causing a reduction in the green strength of the resultant molded product. U.S. Pat. No. 4,111,861 discloses acidic additives to facilitate mold release of a RIM system and recognizes the increased reactivity caused by such additives (note column 3, lines 30ff). The reference overcame the reactivity problem by combining the acidic additive with a polar metal compound.

Various references describe the use of tin mercaptides as catalysts in RIM systems (see, e.g., U.S. Pat. Nos. 4,239,857, 4,379,105, 4,519,965, 4,764,540, 4,792,576 and 4,895,879).

DESCRIPTION OF THE INVENTION

The present invention is directed to a novel catalyst package which can be used with substantially any acidic additive and/or acidic internal mold release agent, an active hydrogen containing mixture which contains such a catalyst, and the use thereof in a reaction injection molding ("RIM") process.

More particularly, the present invention is directed to a catalyst system comprising:

a) a zinc-containing compound capable of catalyzing the reaction of an isocyanate group with an hydroxyl group, b) a non-zinc-containing metal compound capable of catalyzing the reaction of an isocyanate group with an hydroxyl group, and c) a tertiary amine, wherein the amounts of materials used correspond to the following:

1) the weight ratio of tertiary amine c) to metal compound b) is from 1:10 to 40:1, preferably from 1:5 to 15:1,
2) the weight ratio of tertiary amine c) to zinc compound a) is from 1:3 to 100:1, preferably from 1:1 to 25:1, and
3) the weight ratio of metal compound b) to zinc compound a) is from 1:5 to 50:1, preferably from 1:2 to 25:1.

The invention also relates to an active hydrogen group containing mixture which comprises:

A) the above noted catalyst system

B) one or more compounds having molecular weights of from 400 to 10,000, and containing at least two isocyanate reactive groups, C) one or more compounds having molecular weights of from 62 to 399, and containing at least two isocyanate reactive groups, D) one or more acidic additives, with the proviso that the amount of the zinc-containing compound is no more than 0.25% by weight of the total weight components B), C) and D).

Preferably, the amount of zinc-containing compound is from 0.05 to 0.15% by weight of the total weight components B), C) and D).

Finally, the invention relates to the use of the catalyst system in a RIM process.

Catalyst System (Component A):

The catalyst system of the present invention (i.e., component A) of the active hydrogen group containing mixture) requires three specific materials in the weight ratios noted above. The first required material is a) a zinc-containing compound capable of catalyzing the reaction between an isocyanate group and an hydroxyl group. Such zinc compounds are known and include zinc carboxylates which are based upon $C_2$ to $C_{24}$, branched or straight chain fatty acids which may be saturated or unsaturated. The carboxylates also include the commercial preparations of specific carboxylates which also contain impurities or by-products of other fatty acid derivatives. Examples of specific carboxylates include zinc stearate, zinc oleate, zinc octoate, zinc laurate, zinc behenate, zinc ricinoleate, and the like.

The second component of the catalyst system herein is b) a non-zinc containing metal compound capable of catalyzing the reaction of an isocyanate group with an hydroxy group. These materials are known in the art, and are described, e.g., in "Polyurethanes: Chemistry and Technology", Part I. Chemistry, Saunders and Frisch, 1962, pages 161–173, the disclosure of which is herein incorporated by reference. Such compounds include various bismuth, lead, sodium, lithium, potassium, tin, titanium, iron, antimony, cadmium, cobalt, aluminum, nickel and copper compounds. Preferred are tin compounds including stannous salts and dialkyl tin salts of carboxylic acids having from 1 to 18 carbon atoms, dialkyl and trialkyl tin oxides and dialkyl tin chlorides. Specific useful tin compounds are described in U.S. Pat. Nos. 3,397,158, 3,347,804, 3,822,223 and 4,217,247. Particularly preferred are dialkyl tin mercaptides such as dibutyltin dimercaptide and dimethyltin dimercaptide (both of these tin compounds are commercially available from Witco as Formez UL-1 and UL-22), and dialkyltin mercaptide carboxylic acid esters (see, e.g., U.S. Pat. No. 4,239,857).

The third component of the catalyst system herein is c) a tertiary amine. The tertiary amines useful herein are generally known in the art for catalyzing the reaction between isocyanates and active hydrogen containing compounds. These include triethylenediamine (Dabco); N-methylmorpholine; N-ethylmorpholine; triethylamine; N-methyidiethanolamine; N,N-diethyl- and dimethylaminoethanol; triethanolamine; tetramethylguanidine; N,N,N',N'-tetramethylethylenediamine; N,N-dimethyl-$C_{10}$–$C_{18}$ amine; N,N-dimethylcyclohexylamine; N,N-dimethylpiperazine; 1,2,4-trimethylpiperazine; bis-(2-hydroxypropyl)-2-methylpiperazine; bis($\beta$-dimethyl-aminoethyl)ether; tributylamine; N-cocomorpholine; N-methyl-N'-dimethylaminoethylpiperazine; N,N-dimethylbenzylamine; bis(N,N-diethylaminoethyl)-adipate; N,N-diethylbenzylamine; pentamethyidiethylenetriamine; N,N,N',N'-tetramethyl-1,3-butanediamine; N,N-dimethyl-$\beta$-phenylethylamine; 1,2-dimethylimidazole; 2-methylimidazole; pyridine; pentamethyidipropylenetriamine; and the like.

The catalyst systems are used with RIM systems which consist of active hydrogen containing materials and isocyanates. The active hydrogen containing materials are mixtures of B) one or more compounds having molecular weights of from 400 to 10,000, and containing at least two isocyanate reactive groups, C) one or more compounds having molecular weights of from 62 to 399, and containing at least two isocyanate reactive groups, and D) one or more acidic additives.

In accordance with the present invention, the catalyst systems A) are usually present in an amount of from 0.1 to 8%, preferably from 0.5 to 5% by weight, based on the quantity of high molecular weight active hydrogen containing compounds B). The low molecular weight chain extenders are usually present in an amount of from about 5 to about 50% by weight, based on the quantity of the high molecular weight active hydrogen containing compounds B). The acidic additives D) are usually present in an amount sufficient to raise the acid number of the entire blend (i.e. components A) and B) and C) and D)) to a value of between 0.1 mg KOH/g and 12 mg KOH/g.

Compounds Containing Isocyanate Reactive Groups (Components B) and C)):

These components may be typically divided into two groups, relatively high molecular weight compounds having molecular weights of 400 to about 10,000 and low molecular weight compounds, i.e. chain extenders, having molecular weights of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. patents.

Finally, representatives of the many and varied compounds which may be used in accordance with the invention may be found for example in High Polymers, Volume XVI, "Polyurethanes, Chemistry and Technology," by Saunders-Frisch, lnterscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

So-called "aminopolyethers" may be used in accordance with the present invention as high molecular weight compounds (the molecular weight is always the average molecular weight which may be calculated from the functionality and the content of isocyanate-reactive groups). Such aminopolyethers include those wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (Belgian Patent 634,741). U.S. Pat. No. 3,654,370 describes the production of polyoxyalkylene polyamines by reaction of the corresponding polyol with ammonia and hydrogen in the presence of a nickel, copper, chromium catalyst. German Patent 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728 and 3,236,895 and French Patent 1,551, 605. The production of polyethers containing terminal secondary amino groups is described, for example, in French Patent 1,466,708.

Polyhydroxypolyethers of relatively high molecular weight may be converted into the corresponding anthranilic acid esters by reaction with isatoic acid anhydride, as described, for example, in German Offenlegungsschriften 2,019,432 and 2,619,840 and in U.S. Pat. Nos. 3,808,250, 3,975,428 and 4,016,143. Polyethers containing terminal aromatic amino groups are formed in this way.

According to German Offenlegungsschrift 2,546,536 and U.S. Pat. No. 3,865,791, relatively high molecular weight compounds containing terminal amino groups are obtained by reaction of isocyanate terminated prepolymers based on polyhydroxypolyethers with enamines, aldimines or ketimines containing hydroxyl groups and subsequent hydrolysis.

It is preferred to use amino polyethers obtained by hydrolysis of compounds containing terminal isocyanate groups, for example in accordance with German Offenlegungsschrift 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amine groups.

Also useful are amino compounds prepared by reacting the corresponding polyol with a halogenated nitrobenzene compound such as o- or p-nitrochlorobenzene, followed by the reduction of the nitro group(s) to the amine as described in U.S. application Ser. No. 183,556, filed on Apr. 19, 1988, and in published European Application 0,268,849, published Jun. 1, 1988. Also useful are amino compounds prepared by reacting an amine with an acetoacetylated polyol as described in U.S. application Ser. Nos. 523,769 (filed on May 15, 1990), 524,268 (filed on May 15, 1990), and 562,293 (filed on Aug. 3, 1990).

The "aminopolyethers" used in accordance with the invention are often mixtures of the compounds mentioned by way of example and (on a statistical average) most preferably contain 2 to 4 terminal isocyanate-reactive groups. In the process according to the invention, the "amino-polyethers" may be used in admixture with polyhydroxypolyethers free from amino groups.

In accordance with the present invention, the high molecular weight compounds are used in admixture with from about 5 to about 50% by weight based on the quantity of the high molecular weight active hydrogen containing compound, of low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl-2,4-diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4, 4'-diamino diphenylmethane, 3,5-diethyl-5,5'-diisopropyl-4, 4'-diamino diphenylmethane, 1-methyl-2,6-diamino-3-isopropylbenzene and mixtures of the above diamines. Most preferred are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine, and triphenylmethane-4, 4',4"-triamine. The difunctional and polyfunctional aromatic compounds may also be used. They may also contain secondary amino groups. Such compounds include 4,4'-di-(methylamino)-diphenylmethane or 1-methyl-2-methylamino-4-amino-benzene. Liquid mixtures of polyphenyl polymethylene polyamines of the type obtained by condensing aniline with formaldehyde are also suitable. Generally, the nonsterically hindered aromatic diamines are too reactive to provide sufficient processing time in a RIM system. Accordingly, these diamines and polyamines should generally be used in combination with one or more of the previously described sterically hindered diamines or hydroxyl group-containing chain extenders.

Acidic Additives/Release Agents (Component D)):

Substantially any acidic release agent can be used. Suitable materials are described in U.S. Pat. Nos. 3,726,952, 3,925,527, 4,058,492, 4,098,731, 4,111,861, 4,201,847, 4,254,228, 4,868,224, and 4,954,537, and in U.S. patent application Ser. Nos. 07/698,069, 07/660,759, and 07/697, 153, filed on Apr. 22, 1991, Feb. 25, 1991, and May 8, 1991, respectively, all the disclosures of which are herein incorporated by reference. Release agents useful herein comprise substantially any release agent which is acidic in nature. Acidic release agents generally have acid numbers in the range of from about 5 to about 400, and preferably from about 15 to about 300. Fatty acids may be used alone. Also useful are acidic silicone release agents such as Dow Coming Q2-7119. The presently preferred acidic release agents are acidic fatty polyesters of the type known from the polyurethane art.

Regardless of the specific acidic release agent used, the amount of acidic release agent used should be sufficient to raise the acid number of the entire blend (i.e. components A) and B) and C) and D)) to a value between 0.1 mg KOH/g and 12 mg KOH/g. Accordingly, the actual quantity of one specific acidic release agent may be considerably larger (or smaller) than the actual quantity of a different acidic release agent to raise the acid number of the blend to a value between 0.1 mg KOH/g and 12 mg KOH/g. The necessary quantity of a specific acidic release agent is easily determined by one skilled in the art.

Processing:

In processing via the RIM process, the active hydrogen components are reacted with isocyanates. Starting polyisocyanate components for use in the RIM process include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenylmethane-2,4- and/or -4,4'-diisocyanate; naphthylene-1,5-diisocyanate; triphenyl methane-4,4',4"-triisocyanate; polyphenyl polymethylene polyisocyanates of the type obtained by condensing aniline with formaldehyde, followed by phosgenation and described, for example, in British Patents 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift 1,157,601 (U.S. Pat. No. 3,277,138); polyisocyanates containing carbodiimide groups of the type described in German Patent 1,902,007 (U.S. Pat. No. 3,152,162); diisocyanates of the type described in U.S. Pat. No. 3,492,330; and polyisocyanates containing allophanate groups of the type described, for example, in British Patent 993,890, in Belgian Patent 761,626 and in published Dutch Patent Application 7,102,524 are still further examples of suitable isocyanates. Additionally, polyisocyanates containing isocyanurate groups of the type described, for example, in U.S. Pat. No. 3,001,973; in German Patents 1,022,789; 1,222,067 and 1,027,394 and in German Offenlegungsschriften 1,929,034 and 2,004,408; polyisocyanates containing urethane groups of the type described, for example, in Belgian Patent 752, 261 or in U.S. Pat. No. 3,394,164; polyisocyanates containing acylated urea groups according to German Patent 1,230, 778 and polyisocyanates containing biuret groups of the type described, for example, in German Patent 1,101,394 (U.S. Pat. Nos. 3,124,605 and 3,201,372) and in British Patent 889,050 are also suitable.

Polyisocyanates produced by telomerization reactions of the type described, for example, in U.S. Pat. No. 3,654,106; polyisocyanates containing ester groups of the type described for example, in British Patents 965,474 and 1,072, 956, in U.S. Pat. No. 3,567,763 and in German Patent 1,231,688; reaction products of the above-mentioned isocyanates with acetals according to German Patent 1,072,385 and polyisocyanates containing polymeric fatty acid residues, according to U.S. Pat. No. 3,455,883 are still further examples of suitable isocyanate.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent 1,618,380 (U.S. Pat. No. 3,644,457). These may be produced for example, by reacting 1 mol of 4,4'-diisocyanatodiphenyl-methane with from 0.05 to 0.3 moles of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent 1,092,007 (U.S. Pat. No. 3,152,162). Mixtures of these preferred polyisocyanates can also be used. In general, aliphatic and cycloaliphatic isocyanates are less suitable for the purposes of the instant invention.

Also preferred are the polyphenyl-polymethylene polyisocyanates obtained by the phosgenation of an aniline/formaldehyde condensate.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additive which is to be included. According to the present invention, the internal release agent is added to the isocyanate reactive components.

The invention is further illustrated but is not intended to be limited by the following examples in which all parts and percentages are by weight unless otherwise specified.

EXAMPLES

In the examples which follow, the following materials were used:

POLYOL A: a glycerine/ethylene oxide/propylene oxide reaction product containing about 88% primary hydroxyl groups and having an OH number of about 28 and a molecular weight of about 6000.

POLYOL B: an ethylene diamine/propylene oxide adduct having an OH number of about 630 and a molecular weight of 356.

DETDA: an 80/20 blend of 1-methyl-3,5-diethyl-2,4- and -2,6-diaminobenzene.

ST ACID: a commercially available product known as Pristerene 4910 (from Unichema), which is a mixture of 64% stearic acid and 29% palmitic acid, with the balance being a mixture of $C_{12}$ and higher acids; Pristerene 4910 has an acid number of from 202 to 210 and an Iodine value of 2.

UL-22: a commercially available dimethyltin dialkyl mercaptide available from Witco.

PC-77: a commercially available pentamethyldipropylene triamine from Air Products.

PC-8: a commercially available N,N-dimethylcyclohexylamine from Air Products.

ZNOCT: zinc octoate.

L-5304: a commercially available silicone surfactant from Union Carbide.

UL-28: a commercially available dimethyltin dicarboxylate from Witco.

COS 83: Coscat 83, bismuth trineodecanoate available from Cosan.

ISO: a tripropylene glycol/4,4'-methylenebis (phenylisocyanate) adduct having an NCO content of about 23%.

IMR: an acidic release agent prepared by first esterifying oleic acid, adipic acid and pentaerythritol to a 51 OH number and then esterifying the resultant polyester with an excess of myristic acid to an OH number of 3 and an acid number of 39.

The evaluation of how a zinc compound affects the processing of a RIM system was observed through a series of tests. The procedure for the study was to prepare the formulations (the "B-SIDE) with and without zinc compound (and without any isocyanate and to allow the formulations to age for a minimum of 6 hours. The formulations were allowed to age since freshly prepared blends do not always show the accelerated reaction rates.

RIM plaques were then prepared using a laboratory piston metering unit and clamping unit. The metering unit was a two component instrument having a maximum metering capacity of 0.6 liters. A rectangular mold, 300 mm×200 mm×3 mm, was used to mold the samples under the following conditions:

ISO temperature 45° C.

B-side temperature 45° C.

Isocyanate index 105

Mold temperature 65° C.

Demold time 30 seconds

The mold was cleaned with N-methyl pyrrolidinone and then sprayed with Chemtrend 2006 soap solution.

It was observed that acidic formulations without zinc compound had faster reactivities than those containing zinc compound. The increased reactivity produced rounded corners and, upon aging, only a partial panel with short shot times. Formulations with zinc compound showed a slower reactivity and allowed the shot times to be longer while still producing full panels in the mold. The zinc compound containing formulations also gave better quality panels as to green strength, tear strength, nucleation and release.

The formulations used and the results observed were as set forth in the Table. The weight ratio of B-side to ISO was a) 100:49.8 for Examples 1, 2, 4, 5 and 6, b) 100: 49.9 for Example 3, and c) 100:50.2 for Examples 7 and 8. The isocyanate index for each example was 105.

TABLE

| Example: | 1 | 2 | 3 | 4 | 5 | 6 | 7 | 8 |
|---|---|---|---|---|---|---|---|---|
| B-SIDE: | | | | | | | | |
| POLYOL A | 73.2 | 73.1 | 74.0 | 73.2 | 73.3 | 73.2 | 77.4 | 77.3 |
| DETDA | 16.5 | → | → | → | → | → | → | → |
| POLYOL B | 3.0 | → | → | → | → | → | → | → |
| IMR | 6.0 | → | → | → | → | → | — | — |
| ST AC | — | — | — | — | — | — | 2.0 | 2.0 |
| UL-22 | 0.2 | 0.2 | — | — | — | — | 0.2 | 0.2 |
| PC-77 | 0.4 | → | → | → | → | → | — | — |
| PC-8 | — | — | — | — | — | — | 0.2 | 0.2 |
| ZNOCT | — | 0.1 | — | 0.1 | — | 0.1 | — | 0.1 |
| L-5304 | 0.7 | → | → | → | → | → | → | → |
| UL-2B | — | — | 0.12 | 0.12 | — | — | — | — |
| COS 83 | — | — | — | — | 0.15 | 0.15 | — | — |
| Results: | | | | | | | | |
| ending shot time (seconds) | 1.4 | 1.8 | 1.0 | 1.4 | 1.0 | 1.2 | 1.0 | 1.6 |

The ending shot time represents the longest time in seconds it takes to inject 190 grams of material (i.e., B-side and ISO) into the mold without observing rounded corners indicating that the system is gelling before a complete fill is attained. Shot times were increased by increments of 0.2 seconds until the parts shows signs of incomplete fill. Thus, the longer the ending shot time, the slower the system. This means greater flowability.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An active hydrogen group containing mixture which comprises:

A) a catalyst system comprising:
   a) a zinc-containing compound capable of catalyzing the reaction of an isocyanate group with an hydroxyl group,
   b) a non-zinc-containing metal compound capable of catalyzing the reaction of an isocyanate group with an hydroxyl group, and
   c) a tertiary amine,
   wherein the amounts of materials used correspond to the following:
      1) the weight ratio of tertiary amine c) to metal compound b) is from 1:10 to 40:1,
      2) the weight ratio of tertiary amine c) to zinc compound a) is from 1:3 to 100:1, and
      3) the weight ratio of metal compound b) to zinc compound a) is from 1:5 to 50:1, B) one or more compounds having molecular weights of from 400 to 10,000, and containing at least two isocyanate-reactive groups, C) one or more compounds having molecular weights of from 62 to 399, and containing at least two isocyanate-reactive groups, and D) one or more acidic additives, wherein said catalyst system A) is present in an amount of from 0.1 to 8% by weight, based on the weight of B); said compounds having molecular weights of from 62 to 399 and containing at least two isocyanate-reactive groups are present in an amount of from 5 to 50% by weight, based on the weight of B); and said acidic additives D) are present in an amount sufficient to raise the acid number of the blend of components A), B), C) and D) to a value of from 0.1 to 12 mg KOH/g; with the proviso that the amount of zinc-containing compound A)a) is no more than 0.25% by weight, based on the total weight of components B), C) and D).

2. The mixture of claim 1, wherein:
   1) the weight ratio of tertiary amine c) to metal compound b) is from 1:5 to 15:1,
   2) the weight ratio of tertiary amine c) to zinc compound a) is from 1:1 to 25:1, and
   3) the weight ratio of metal compound b) to zinc compound a) is from 1:2 to 25:1.

3. The mixture of claim 1, wherein the amount of zinc-containing compound is from 0.05 to 0.15% by weight, based on the total weight of components B), C) and D).

* * * * *